May 6, 1958 G. SHAW 2,833,314
LOOM
Filed April 12, 1955 6 Sheets-Sheet 1

INVENTOR.
Gilbert Shaw
BY
Morgan, Finnegan, Durham & Pine
ATTORNEYS.

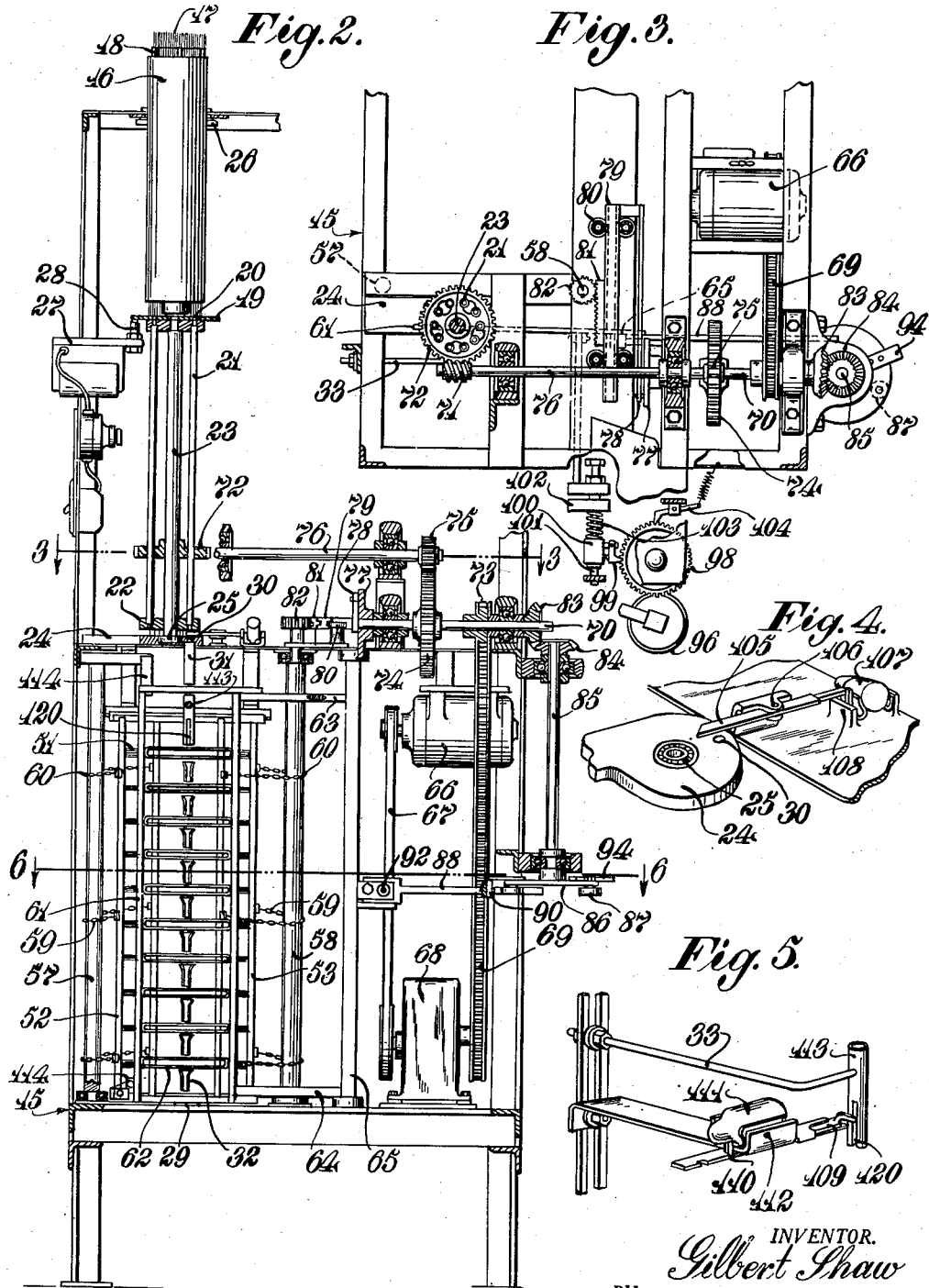

May 6, 1958 G. SHAW 2,833,314
LOOM
Filed April 12, 1955 6 Sheets-Sheet 3
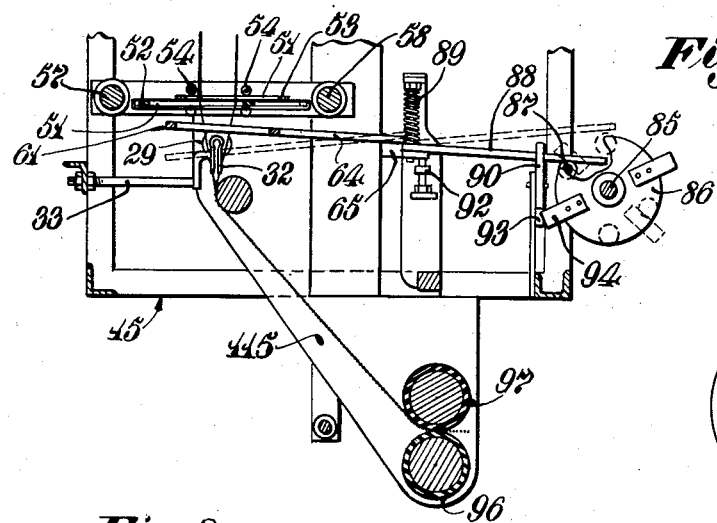
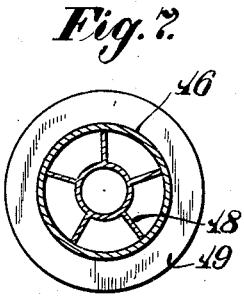
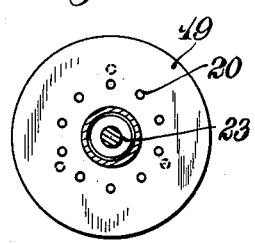
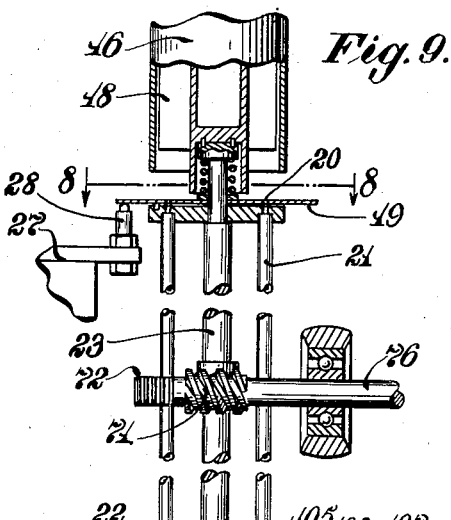
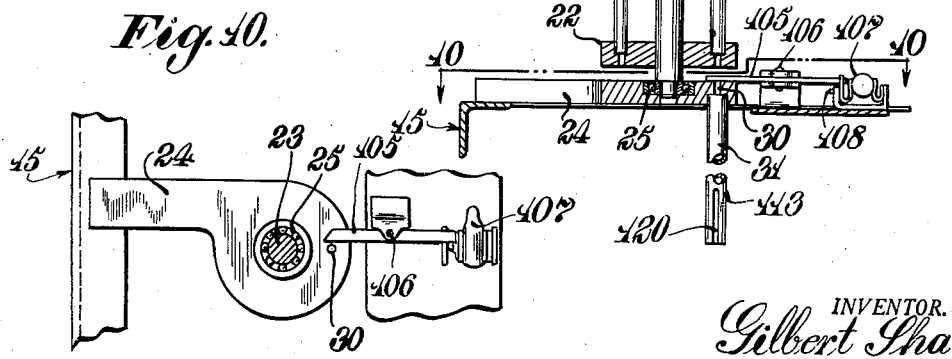
INVENTOR.
Gilbert Shaw
BY
Morgan, Finnegan, Durham & Pine
ATTORNEYS.

May 6, 1958  G. SHAW  2,833,314
LOOM
Filed April 12, 1955  6 Sheets-Sheet 4

INVENTOR.
Gilbert Shaw
BY
Morgan, Finnegan, Durham & Pine
ATTORNEYS.

May 6, 1958 G. SHAW 2,833,314
LOOM
Filed April 12, 1955 6 Sheets-Sheet 5
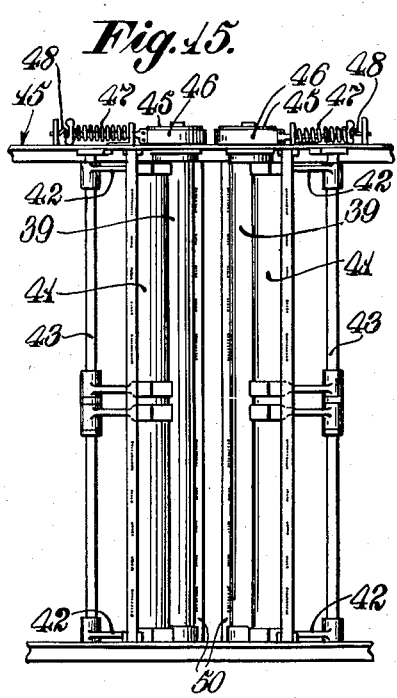
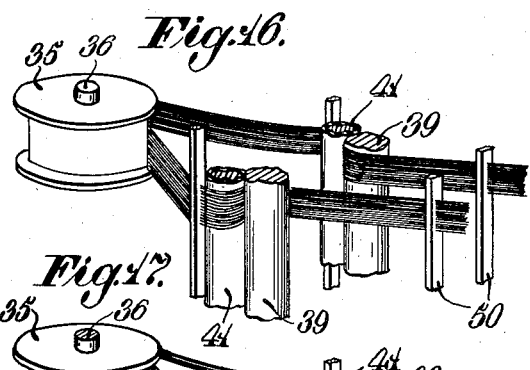
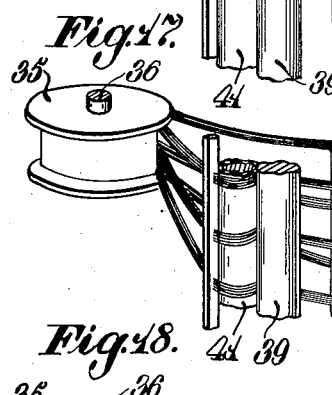
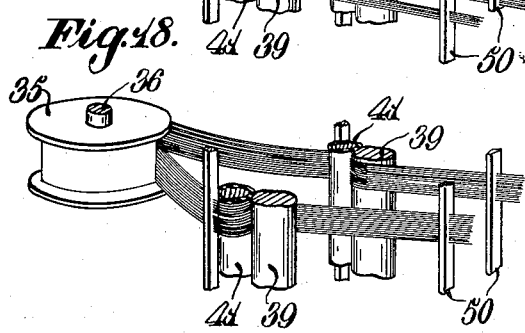
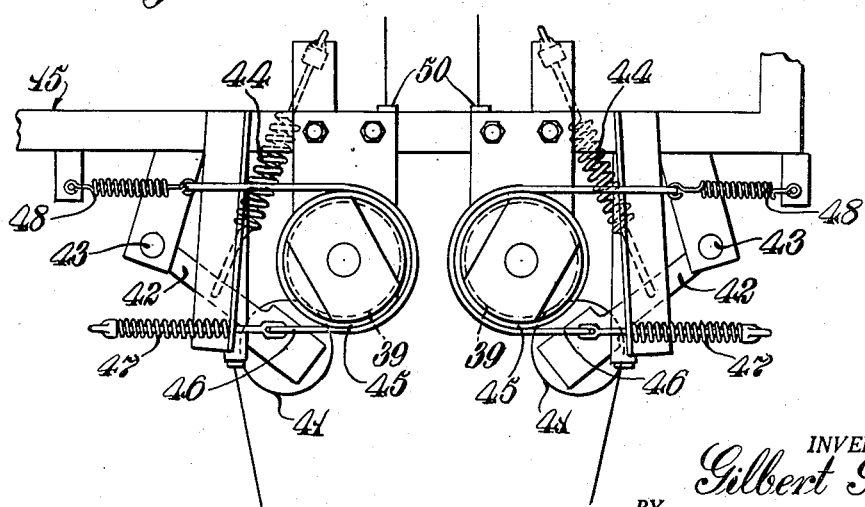
INVENTOR.
Gilbert Shaw
BY
Morgan, Finnegan, Durham & Pine
ATTORNEYS.

May 6, 1958　　　　　　　G. SHAW　　　　　2,833,314
LOOM
Filed April 12, 1955　　　　　　　　　　　6 Sheets-Sheet 6
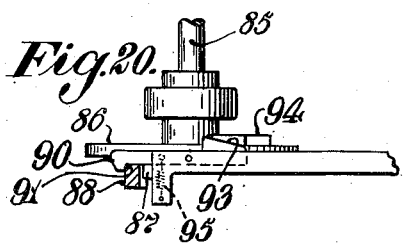
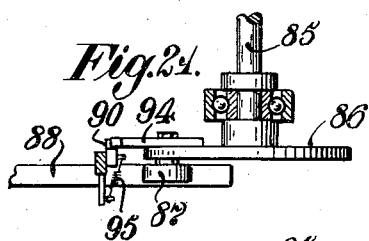
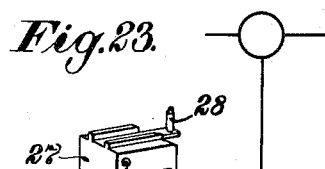
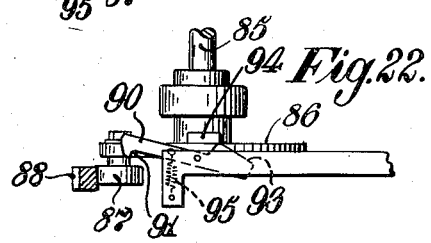
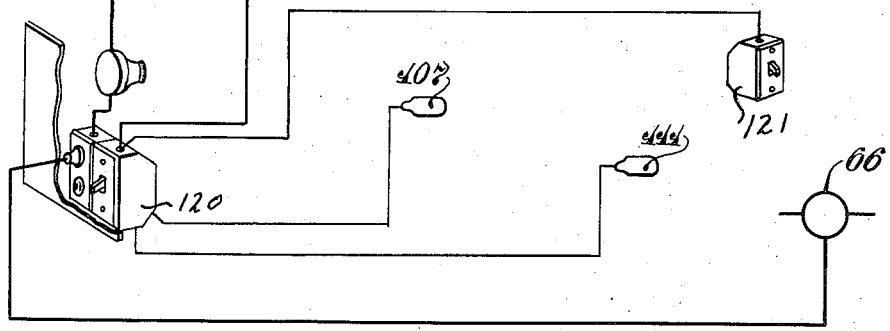
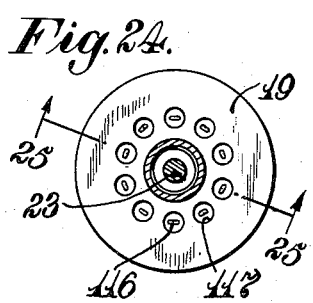
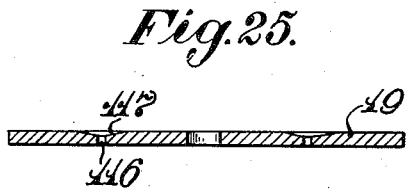
INVENTOR.
Gilbert Shaw
BY
Morgan, Finnegan, Durham & Pine
ATTORNEYS.

United States Patent Office 2,833,314
Patented May 6, 1958

2,833,314

LOOM

Gilbert Shaw, Middlebury, Vt.

Application April 12, 1955, Serial No. 500,813

19 Claims. (Cl. 139—18)

The present invention relates to a loom for the weaving of fabrics comprising relatively stiff and relatively limp fibers or strands. By relatively stiff is meant that the fiber or strand used in the fabric is able to support itself without collapse when standing substantially vertically upon its long axis or dimension, and by relatively limp is meant that the fiber or strand is similar to usual threads, strands or fibers used in making fabrics, in that it is limber and pliable. The fabric or material which the loom of the invention is especially adapted to produce is typified by the familiar bamboo or straw matting, wherein relatively stiff bamboo or straw strands are interwoven with limp and conventional thread or the like to produce a flexible and easily rolled-up mat or screen.

The loom of the invention is particularly adapted to produce a fabric or matting such as that disclosed in my copending application Serial No. 409,998 filed February 12, 1954. The product there disclosed comprises weft strands or fibers of relatively hard and inelastic, though flexible, material such as monofilaments of polystyrene, interwoven with warp threads of elastic yarn such as plasticized vinyl chloride. The weft strands are on the order of .050 to .125 inch in diameter, while the weft yarn is on the order of .012 to .020 inch in diameter. The woven material is highly useful and decorative for dinner place mats, screens, lamp shades, porch blinds, and similar uses.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

Of the drawings:

Fig. 2 is a vertical cross-sectional view of the embodiment shown in Fig. 1;

Fig. 3 is a cross-sectional view taken along line 3—3 of Fig. 2;

Fig. 4 is a fragmentary perspective view of the automatic control mechanism for stopping the loom when a weft strand has failed to be properly passed through the supply mechanism;

Fig. 5 is a fragmentary perspective view of other automatic control mechanism for stopping the loom when a weft shaft has failed to be woven in properly aligned position in the fabric or mat;

Fig. 6 is a fragmentary horizontal sectional view taken along the line 6—6 of Fig. 2 showing details of the beater drive and shedding harness;

Fig. 7 is an enlarged fragmentary horizontal cross-section view of the fiber containing casing showing divider webs therein;

Fig. 8 is a fragmentary horizontal cross-sectional view taken along the line 8—8 of Fig. 9;

Fig. 9 is an enlarged fragmentary and more detailed section view of the fiber casing, vibrating disc, fiber tubes, and associated parts;

Fig. 10 is a plan and cross-section view taken along line 10—10 of Fig. 9;

Figure 1:
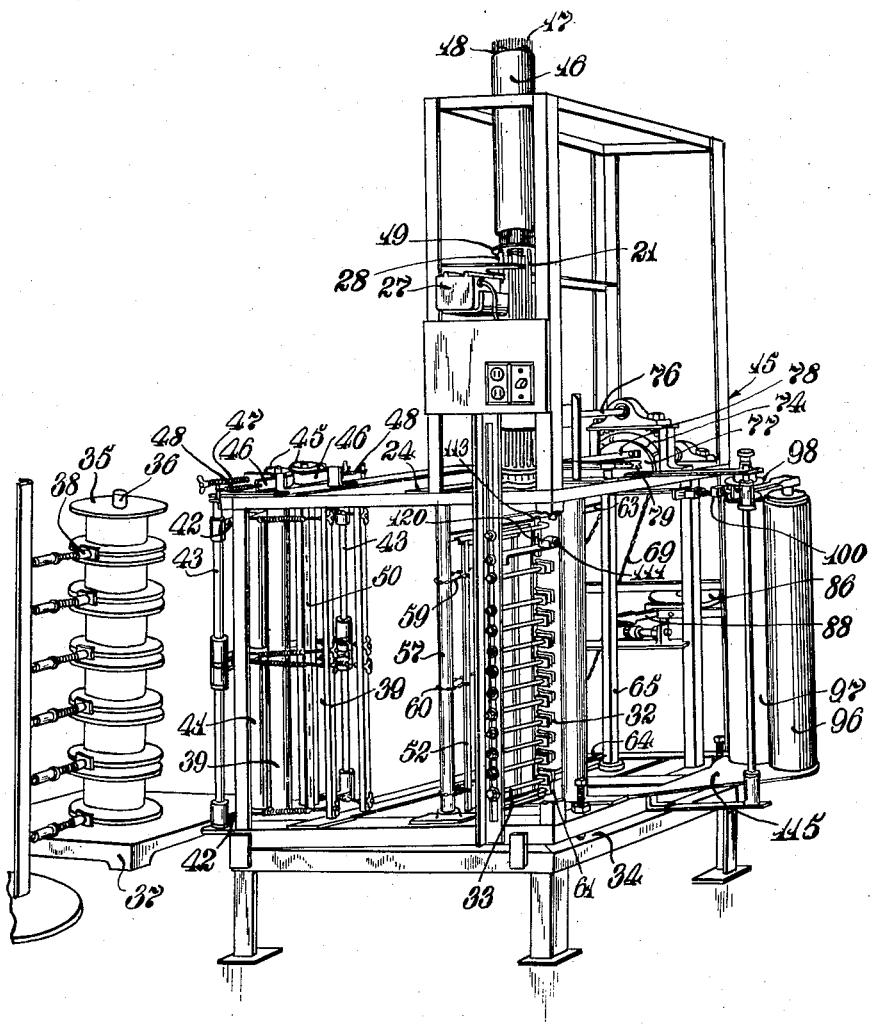
Fig. 1 is a side perspective view of an illustrative embodiment of the loom of the invention.
Figure 11:
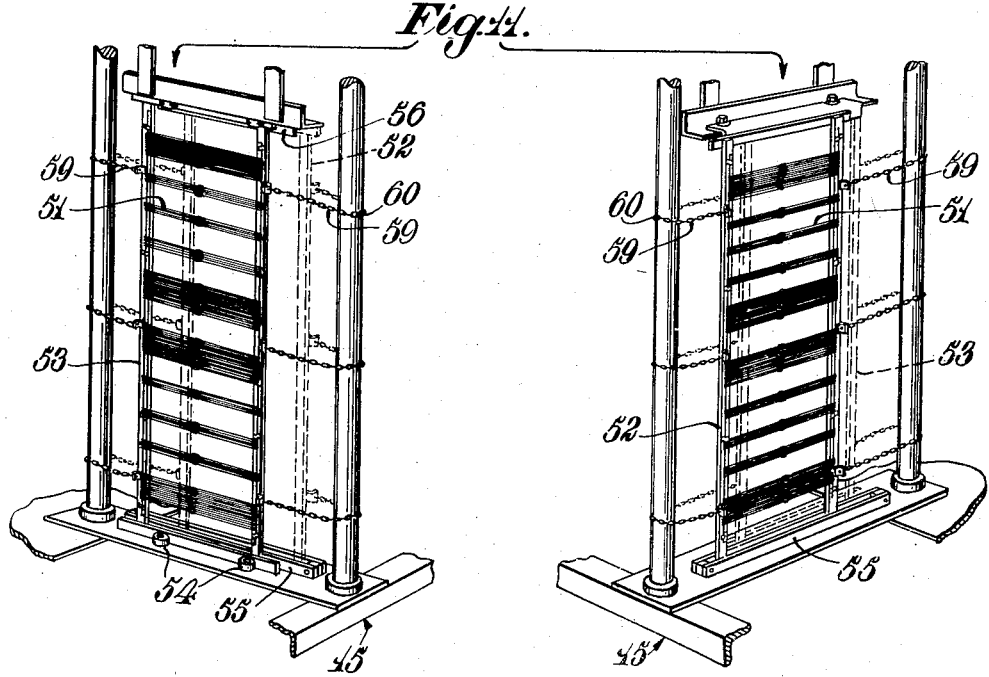
Figure 12:
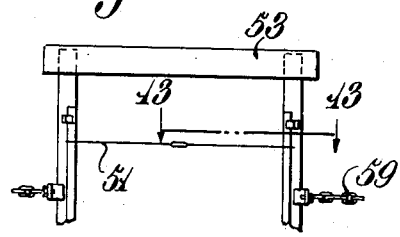
Figure 13:
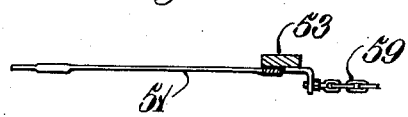
Figure 14:
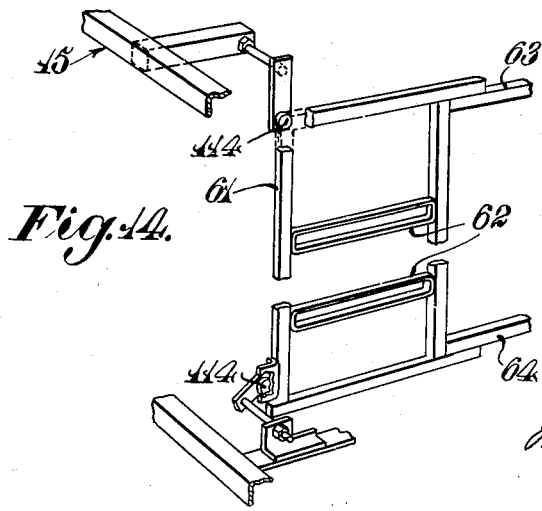

Fig. 11 consists of enlarged perspective views of the shedding harnesses;

Fig. 12 is an enlarged fragmentary detail view of one of the shedding harnesses showing the attachment of the healds to the harness;

Fig. 13 is an enlarged detail view taken on line 13—13 of Fig. 12;

Fig. 14 is an enlarged perspective fragmentary view of the beater mechanism showing the top and bottom stops for the beater;

Fig. 15 is a side elevational view of the letting-off mechanism shown in Fig. 1 as viewed from the supply spools for the warp yarn;

Fig. 16 is a view of the top yarn supply spool showing yarn leads from the spool to rollers and the means for keeping the yarn separated;

Fig. 17 is a view of the second yarn supply spool from the top showing yarn leads from the spool to rollers and the means for keeping said yarn separated;

Fig. 18 is a view similar to Fig. 16 of the third yarn supply spool from the top showing yarn leads from said supply spool to rollers and the means for keeping said yarn strands separated. The remaining three yarn supply spool and leads are the same as those shown;

Fig. 19 is a top plan view of the letting-off mechanism shown in Fig. 15;

Fig. 20 is a side elevational view of the cam and latch mechanism which controls the beater action, the cam being shown in starting to release the latch on the beater arm;

Fig. 21 is a view taken at 90° angle of Fig. 20 showing the same mechanism;

Fig. 22 is a view of the mechanism shown in Figs. 20 and 21 showing the latch released and the beater arm at its extreme travel for bringing fibers to be woven into the mat;

Fig. 23 is a diagrammatic showing of the circuit for electrical controls of the loom;

Fig. 24 is a view showing a modification of the vibrating disc wherein oval openings instead of circular openings are provided; and Fig. 25 is a sectional view taken on line 25—25 of Fig. 24.

The loom of the invention in the illustrative embodiment herein shown and described comprises storage supply means for a plurality of relatively stiff fibers or strands which are woven to become the weft of the finished fabric or mat, such strands being pre-cut to desired lengths and stored in vertical and compact arrangement in an elevated position with respect to the balance of the loom mechanism. Feeding means are provided for separating and feeding such shafts individually and continuously by a downward, gravity, drop into position in the shed of the yarn which forms the warp of the finished fabric or mat. Storage and supply means for the warp yarn comprises vertically-arranged spools from which the desired number of warp strands of yarn are drawn, one above the other, into and through the shedding mechanism, comprising eyed healds which are mounted for reciprocating motion along horizontal paths. A vertically-arranged reed or beater is reciprocatingly driven to beat-up the stiff weft strands as they are successively dropped into the shed of the warp yarn, and the woven fabric or mat is then taken off as a vertically-positioned web, which may be rolled if desired or successively cut into measured lengths as desired. Integrated and timed driving means are provided for the feeding of the weft strands and warp yarn, and the reciprocation of the shedding harness and beating reed.

Referring now in detail to the illustrative embodiment of the invention shown by way of example in the accompanying drawings, the loom comprises a suitable framework for the support of the various parts which will be described, said framework being designated generally by the numeral 15. Mounted at the top of the loom as a storage and feeding mechanism for the stiff fibers which become the weft of the fabric produced, is a rotatable unit which includes the cylindrical casing 16 open at its top end. The fibers 17 are supplied to the casing 16 through the upper open end, and are confined in the interior thereof, which is compartmented by a plurality of radially-extending webs 18, which extend the length of the casing 16. Five such compartments are formed in the illustrative embodiment shown in the drawings, serving to hold the fibers 17 in upright and divided groups of fibers about the axis of the casing 16. The fibers in casing 16 are supported on a circular plate 19 which has a plurality of apertures 20 spaced in a circular pattern adjacent the edge of the plate. There are ten such apertures provided in the illustrated embodiment, two positioned beneath each of the compartments in casing 16, into which the fibers are individually fed. The apertures 20 should be just large enough to accommodate a single fiber 17 and perhaps slightly larger for free movement of the fiber therethrough, but not large enough to allow a plurality of the fibers to pass at the same time.

Each aperture 20 communicates with a guide tube 21, of which there are ten in the embodiment shown. The guide tubes are countersunk for support and positioning at their upper ends in the lower surface of plate 19, and at their bottom ends in a lower circular plate 22. The plates 19 and 22 are secured to a central shaft 23 which holds them and guide tubes 21 in assembled relationship, and which also supports casing 16, as shown in Fig. 9, forming a single integral unit of the casing 16, plates 19 and 22, and guide tubes 21. The unit is mounted for rotary motion about a vertical axis by means of a bearing 25 in a horizontal portion 24 of the framework 15. Radial bearings 26 are provided on the upper framework engaging the outer cylindrical surface of casing 16, guiding the unit described when it is rotated on its vertical axis.

A vibrator 27 has its vibrating contact arm 28 engaging the under-surface of plate 19 near the edge thereof, and during operation of the loom the vibrator is constantly actuated to apply vibration to the plate, the casing 16 and the fibers therein. The function of the vibrator is to bounce and constantly relocate the fibers in casing 16 so that each of the tubes 21 always contains a fiber. As soon as a fiber 17 is dropped from one of the tubes 21 as the unit rotates the tube through the drop point, as will be described, the tube is refilled with a fiber as the unit rotates and the vibrator constantly shifts and bounces the fibers in each compartment of casing 16 so that a fiber will drop into the tube 21 beneath it.

The fibers 17 in tubes 21 are supported at their bottoms on a circular framework portion 24 which is spaced beneath the lower plate 22 and is a stationary part of the machine. As the storage and supply unit rotates about its vertical axis, the fibers in tubes 21 are supported by and slide over the upper surface of framework portion 24 until an aperture 30 through the portion is reached. The fiber in the particular tube over aperture 30 then falls freely through the aperture, and downwardly through the hollow cylindrical guide tube 31 positioned immediately below aperture 30. The weft strand 17, so falling, continues to fall downwardly through a plurality of guide members 32 until the lower end of the strand hits a support 29 at the bottom of the loom. This support or pad is preferably made of resilient material to cushion the fall of the weft strand and dampen bounce upwardly thereof, so the strand will sooner be at rest on the support and be ready for weaving into the fabric by beater action and the forming of the next shed.

Each of the guides 32 is held in position beneath the aperture 30 and guide 31 by horizontally extending rods 33, which in turn are affixed to a portion of the framework 15 of the loom. The guides 32 are shaped in the form of a U as shown with open sides directed toward the crossing of the warp strands forming the shed, so that fibers supported therein may be pushed outwardly by the beater and into the warp shed. The upper framework of the machine is tilted on its base, as indicated by numeral 34 in Fig. 1, so that fibers in gudes 32 lean backwardly against the closed backs of the guides until they are propelled outwardly through the open fronts by beater action.

The warp thread or yarn supply comprises a plurality of supply spools 35 mounted for rotation about a vertical axis on shaft 36 which extends upwardly from support 37. Spring-pressed shoes 38 exerting a light pressure on spools 35 prevent slackness in the yarn leads therefrom. The yarn is led from spools 35 to sets of vertically-arranged rollers for further lead to the shedding harness for the weaving operation. As shown, each set of rollers comprises a steel roller 39 rotatably mounted by suitable bearings at top and bottom in the framework 15 of the loom. A rubber covered roller 41 is rotatably mounted at upper and lower ends in upper and lower arms 42 which are rotatable about a vertically-extending shaft 43 which is mounted in the framework 15. A coiled spring 44 extends between each arm 42 and the framework of the loom, urging the two rubber-covered rollers 41 against their respective steel-surfaced rollers 39, forming a bite between which the yarn strands are engaged and controlled.

Braking means are provided for each of the rollers 39 and 41 comprising a brake drum 45 secured to the upper end of each roller 39, and a leather strap or band 46 extends around the drum and is held under tension by a large coiled spring 47 at one end and a smaller coiled spring 48 at the other end, each spring being held to a suitable portion of the framework 15. The pairs of rollers 39 and 41 control the yarn in their bite, providing the rear anchor for the yarn in forming a taut shed for the weaving operation. The yarn is somewhat stretched by the beater operation in weaving and then retracts, in cyclic sequence, and the rollers 39 and 41 with the resilient braking on roller 39 permits the rollers always to maintain firm anchor control on the strands of yarn during the stretching, relaxing, and forward moving, of the yarn therethrough, without transferring tension through to the supply spools 35.

From the bite of the pairs of rollers 39 and 41 the warp yarn passes through vertically-positioned guide plates 50 which are suitably fixed top and bottom in the framework 15 of the loom, two such plates being provided, one in the path of each reach of the shed as it passes from its respective pair of rollers 39 and 41. The guide plates 50 are apertured as shown to receive each strand of yarn through an individual aperture, the plates serving to fix the spacement of the warp yarn in the fabric or mat which is the product of the loom.

From guide plates 50 the two leads of warp yarn for the shed pass through the eyed healds 51 of the shedding harness. The healds are carried by the vertically-positioned rectangular frames 52 and 53. The rearward frame 53 is mounted for horizontal reciprocating motion at its lower end between rollers 54 and a horizontally-extending guide 55. The lower end of the front frame 52 slides in said guide 55 in reciprocating motion. At its upper end the rear frame 53 runs in a horizontal guideway 56. The upper end of the front frame 52 is not guided or restrained, being free to tilt forwardly in shed forming during the weaving operation.

The shedding harness further comprises a pair of shafts 57 and 58 rotatably mounted top and bottom in the loom framework 15, which are positioned one at either side of frames 52 and 53. Each chain 59, two sets of three of which are shown, interconnects the frames 52 and 53, extending from one edge of frame 52 around a shaft 57 or 58 and to connection with the adjacent edge of the other frame 53. Each chain 59 is secured to the shaft 57 or 58 which it passes around as indicated by the rivet 60 or the like. Thus, as shaft 58 is driven in reciprocating rotary motion as hereinafter described, the frames 52 and 53 are pulled by the chains 59 back and forth in horizontal motion, the individual frames being out of phase or moving in opposite directions with respect to each other, continuously forming sheds of the warp yarn by means of healds 51, and into each shed as formed drops a fiber 17 from the weft fiber supply and feeding mechanism which has been described.

The beater comprises a rectangular frame 61, having pairs of horizontally-extending cross bars 62 secured to its vertical arms, said bars being vertically spaced along the frame in position with the eyed healds 51. Warp yarn passes between the bars 62 of each pair. The beater bars 62 are so positioned as to pass between the guides 32 as the beater is driven in pivotal motion, and each time the bars are impelled forwardly they engage the fiber 17 which is then positioned in guides 32 and forces it into the forward apex of the shed of the yarn. Immediately thereafter, as will be understood, the beater bars 62 move backwardly, a new shed is formed by action of shedding frames 52 and 53 with healds 51, and another fiber 17 drops into guides 32, and the entire weaving operation is then repeated.

The beater frame 61 is secured to upper and lower arms 63 and 64 respectively, which extend horizontally to a vertical post 65, said post being suitably mounted for rotary movement at top and bottom in the framework 15 of the loom.

Driving means for the loom comprises the electric motor 66 which drives belt 67, thence through variable speed gear drive 68 to sprocket chain 69. The horizontal shaft 70 is suitably rotatably mounted in the framework, and through gear 74 fast to one end thereof meshing with gear 75 drives shaft 76, which is horizontally positioned and rotatably mounted by suitable bearings in the loom frame. The shaft 70 is driven from chain 69 through sprocket wheel 73 fast to the shaft. The rotary drive of shaft 76 drives worm 71 at its end, which in turn drives worm wheel 72. This gear is secured to shaft 23, also serving as a supporting frame for the tubes 21. Thus it will be apparent that the continuous drive of shaft 70 from motor 66 continuously drives the shaft 76, and from it is continuously driven about the vertical axis of shaft 23 the unit for storing and feeding weft fibers 17. A fiber is dropped into guides 32 each time a tube 21 is rotated to register with aperture 30, and the said tube is again filled with a fiber from casing 16 before the tube is rotated again to dropping position, by action of the vibrator 27.

The drive for the shedding harness is from wheel 77 fast to shaft 70, which wheel has pitman arm 78 pivotally secured thereto, the other end of which arm is pivotally attached to slide bar 79. This bar is mounted for reciprocating motion between rollers 80 secured to the loom frame, and these engage in the longitudinally channelled sides of the bar 79, whereby it is guided in horizontal reciprocating motion. The bar 79 has fast thereto a toothed rack 81 meshed with gear 82 which is fast on the upper end of shaft 58. Thus, as shaft 70 is driven in continuous rotation, the pitman drives bar 79 in longitudinal reciprocating motion, which is converted to reciprocating rotary motion of shaft 58, and this in turn through chains 59 draws the frames 52 and 53 from side to side in opposite directions, successively forming sheds of the warp yarn by healds 51.

The beater drive is through bevel gear 83 fast to shaft 70, meshing with bevel gear 84 fast to the top of vertically-arranged shaft 85, which is rotatably mounted by suitable bearings as shown in the machine frame. At its bottom end, shaft 85 has fast thereto a circular cam plate 86. A pair of cam rollers 87 are mounted on plate 86 at 180° interval. As the cam plate is driven in continuous rotary motion from shaft 85, a roller 87 will engage, twice on each complete rotation of plate 86, the horizontally-extending arm 88 which is secured to the rotatable post 65. The post 65 carries the beater frame 61 by means of arms 63 and 64, as has been described. The arm 88 is pushed by action of cam roller 87 against the compression of spring 89 to forward the beater into the shed of the warp yarn, and the beater is returned to its original poisition against padded stops 114 (Fig. 14) by action of spring 89 as each cam roller 87 clears the end of arm 88. The beater action in both directions is quite swift, particularly the return under the influence of powerful spring 89, and in order to keep the beater from back bounce, a pivotally-mounted finger 90 has a detent 91 to engage and hold arm 88 against stop 92 (Figs. 20, 21, 22). The finger 90 has a raised cam surface 93 on its top surface and at the back thereof, which is engageable by fingers 94 secured to and radially extending from cam plate 86. The two fingers 94 are arranged for engagement with cam surface 93 of finger 90 just before a cam roller 87 engages arm 88 for beater action, whereby the finger 90 is pivoted and detent 91 clears arm 88 for motion. When arm 88 clears a cam roller 87 and returns to its initial position under influence of spring 89, the finger 90, urged downwardly by a small coiled spring 95, engages arm 88 by detent 91 and prevents undesirable and unintended vibration or bouncing of the beater.

Means for taking up the finished fabric or mat comprise vertically-arranged rubber-covered rollers 96 and 97 each suitably rotatably mounted in the loom framework, in the bite of which the finished product is received. Roller 97 carries fast to its upper end toothed wheel 98 which is engaged by ratchet finger 99 mounted on a block 100. The block is slidably mounted on rod 101. Another block 102 is fixed to rod 101, and spring 103 yieldingly spaces block 100 from block 102. The rod 101 is secured to the upper arm 63 which carries the beater frame 61. Thus, each time the beater advances, the rod 101 is pushed with the same motion, yieldingly engaging ratchet 99 in toothed wheel 98 to rotate rollers 97 and 96 a small amount. Backward motion of roller 97 is prevented by escapement finger 104 pivotally mounted and spring-pressed against the teeth of wheel 98.

One automatic cut-off control for the loom comprises the finger 105 extending over the horizontal plate portion 24 which supports fibers in tubes 21 as they are turned toward aperture 30. The arm 105 is just beyond the aperture in the direction of rotation of the fiber supply and feeding unit. If a fiber 17 has failed to drop completely clear of its tube 21, as the unit continues to rotate a portion of the fiber will be carried against arm 105. Rotation of the arm about pivot 106 results, and this motion rocks the mercury switch 107 backwardly about its pivot 108. The switch 107 is in series with the circuit of motor 66, and this action immediately deenergizes the motor and the entire loom operation until the jammed fiber is withdrawn and switch 107 reset to original position.

Another automatic cut-off mechanism comprises the finger 109 adapted to be engaged by a weft fiber 17 impelled forwardly by the beater from the slot 120 of the upper cylindrical guide 113 for the weft fibers, if the upper end of the fiber stands higher than the position of the finger. Thus, if a fiber is too high or is not completely dropped when impelled into the shed for weaving, finger 109 is carried forwardly by the fiber. Cam 110 on finger 109 rocks mercury switch 111 on its pivot 112. The switch 111 also is arranged in series in the circuit of motor 66, and pivoting of the switch interrupts the circuit, stopping the loom until the fiber can be pulled out, switch 111 reset, and operation of the loom continued. Switches 107 and 111 also serve to cut off the vibrator 27, so that pivoting of either switch completely stops operation of the loom until it is re-set. Toggle switches 120 and 121 are provided for individually starting and stopping motor 66 and vibrator 27. The switches are positioned one at either side of the loom so that the operator may have ready access to control of the loom as he works about it.

The lower edge of the fabric or mat which is the product of the loom rests upon a polished plate 115, which surrounds the resilient pad 29, in the framework of the loom, providing a surface of low friction for over which the mat is advanced on one edge. The completed product, in continuous web form, may be wound upon a suitable take-up roll or may immediately be cut into desired lengths for use as mats or the like.

The operation of the loom will be apparent from the description and function of the mechanism which has been made. The motor 66 is continuously driven to continuously rotate the weft fiber supply and delivering means, and fibers 17 of predetermined length are individually dropped at regular timed intervals through aperture 30 into position in guides 32, resting on the resilient pad 29 and extending upwardly into guide 113 just below the position of finger 109 of the automatic control described. The beater frame 61 is impelled forwardly by a cam 87 to forward the fiber into the shed of the warp yarn. The beater is then swiftly retracted under influence of spring 89, and a new shed is formed by crisscross motion of the shedding frames 52 and 53, whereupon a further fiber is dropped into the shed and the cycle is repeated. With each operation of the beater, the take-up rolls 96 and 97 are slightly advanced by the ratchet drive from the beater arm 63, to draw away the fabric or mat as it is produced.

The device has been shown and described for the use of circular fibers 17 as the relatively stiff weft elements of the fabric to be loomed. However, oval-shaped fibers may be utilized by minor modification of the loom. As shown in Figs. 24 and 25, the apertures in support plate 19 may be oval in form as indicated by numeral 116, and be concavely countersunk slightly as shown at 117, so that the oval fibers as they are vibrated will be guided into the apertures and thus into tubes 21.

The invention in its broader aspects is not limited to the specific mechanisms shown and described, but departures may be made therefrom, within the scope of the accompanying claims, without departing from the principles of the invention and without sacrificing its chief advantages.

What is claimed is:

1. A loom, comprising, in combination, supply means for warp elements, shed-forming means for successively forming vertically-arranged sheds of the warp elements, and means for supplying a vertically-positioned weft element in each successive warp shed, said means comprising a container mounted for rotary motion and means for removing individual weft elements from said container for introduction into each successive warp shed.

2. A loom, comprising, in combination, supply means for warp elements, shed-forming means for successively forming vertically-arranged sheds of the warp elements, supply means driven in rotary motion for the gravity forwarding of a weft element into each successive warp shed, and a beater for impelling a weft element into the forward apex of each successive warp shed.

3. A loom, comprising, in combination, supply means for continuous warp elements, shed-forming means for successively forming vertically arranged sheds of the warp elements, supply means for individual weft elements of pre-cut lengths, means for vertically positioning a pre-cut length of weft element in each successive shed including vertically-spaced positioning members, and a beater having portions horizontally reciprocated between said positioning members for impelling a weft element into the forward apex of each successive warp shed.

4. A loom, comprising, in combination, supply means for warp elements, shed-forming means for successively forming vertically-arranged sheds of the warp elements, means for supplying a vertically-positioned weft element into each successive warp shed, and a beater driven about a vertical axis for impelling a weft element into the forward apex of each successive warp shed.

5. A loom, comprising, in combination, supply means for warp elements, shed-forming means for successively forming vertically-arranged sheds of the warp elements, means for supplying a vertically-positioned weft element into each successive warp shed, and a beater driven in reciprocating motion about a vertical axis for impelling a weft element into the forward apex of each successive warp shed.

6. A loom, comprising, in combination, supply means for warp elements, shed-forming means for successively forming vertically-arranged sheds of the warp elements including vertically-arranged shedding frames, means for supplying a vertically-positioned weft element into each successive warp shed by gravity drop of the weft element, a beater driven in reciprocating motion about a vertical axis for impelling a weft element into the forward apex of each successive warp shed, and driving means for driving said shedding frames in horizontal reciprocating motion oppositely directed with respect to each other and for driving said beater in reciprocating rotary motion about a vertical axis.

7. A loom as set forth in claim 6, wherein said beater is driven from a constantly rotating cam means, locking means are provided for engaging and holding said beater in a position unactuated by said cam means, and other cam means are provided for dis-engaging said locking means to free said beater immediately before it is actuated by said first cam means.

8. A loom, comprising, in combination, supply means for warp elements, shed-forming means for successively forming vertically-arranged sheds of the warp elements including vertically-arranged shedding frames, means for supplying a vertically-positioned weft element into each successive warp shed by gravity drop of the weft element, a beater driven in reciprocating motion about a vertical axis for impelling a weft element into the forward apex of each successive warp shed, vertically-arranged pinch rollers for advancing the loomed fabric, and driving means for driving said shedding frames in horizontal reciprocating motion oppositely directed with respect to each other, for driving said beater in reciprocating rotary motion about a vertical axis, and for intermittently forwarding said pinch rollers.

9. A loom, comprising, in combination, supply means for warp elements, shed-forming means for successively forming vertically-arranged sheds of the warp elements, and means driven in rotary motion for supplying a vertically-positioned weft element into each successive warp shed, said last means comprising a container for holding a plurality of pre-cut lengths of weft elements, and means below said container for receiving said lengths individually from said container and forwarding them by gravity drop into the warp shed.

10. A loom, comprising, in combination, supply means for warp elements, shed-forming means for successively forming vertically-arranged sheds of the warp elements, and means for supplying a vertically-positioned weft element into each successive warp shed, said means comprising a support means positioned above said shed-forming means for individually holding a plurality of pre-cut weft elements in a spaced, circular pattern, and means for rotating said support means through a drop-position for the weft elements.

11. A loom, comprising, in combination, supply means for warp elements, shed-forming means for successively forming vertically-arranged sheds of the warp elements, and means for supplying a vertically-positioned weft element into each successive warp shed, said means comprising a container for holding a plurality of pre-cut lengths of weft elements, a support means positioned beneath said container having individual supports in a spaced circular pattern for receiving and holding individual weft elements from said container, and means for rotating said support means through a drop-position for the weft elements.

12. A loom, comprising, in combination, supply means for warp elements, shed-forming means for successively forming vertically-arranged sheds of the warp elements, means for supplying a vertically-positioned weft element into each successive warp shed, a beater for impelling a weft element into the forward apex of each successive warp shed, driven take-up means for advancing the product of the loom from the point of weaving, and anchoring means for the warp elements, said anchoring means comprising pairs of co-acting, vertically-arranged rollers one roller of each pair being resiliently urged toward the other roller of the pair, and at least one roller of each pair having braking means inhibiting free rotation thereof.

13. A loom, comprising, in combination, supply means for warp elements, shed-forming means for successively forming vertically-arranged sheds of the warp elements including vertically-arranged shedding frames, supply means for forwarding by gravity drop a vertically-positioned weft element into each successive warp shed, a beater for impelling a weft element into the forward apex of each successive warp shed, and driving means for driving said shedding frames in horizontal reciprocating motion oppositely directed with respect to each other, driving the weft supply means in continuous rotary motion, and driving the beater in reciprocating rotary motion about a vertical axis.

14. A loom, comprising, in combination, supply means for warp elements, shed-forming means for successively forming vertically-arranged sheds of the warp elements, vertically spaced apart guide elements for holding a weft element in a vertical position in the warp shed, means for intermittently supplying weft elements to said guide elements, and a beater for impelling a weft element into the forward apex of each successive warp shed, said beater having horizontally-extending bars adapted to pass between said guide elements.

15. A loom as set forth in claim 14, wherein said guide elements comprise a plurality of axially-aligned U-shaped guide members the open mouths of which face into the weft shed.

16. A loom, comprising, in combination, supply means for warp elements, shed-forming means for successively forming vertically-arranged sheds of the warp elements, means for supplying a vertically-positioned weft element into each successive warp shed including rotatably-mounted individual weft element carrying means for dropping a weft element at a drop point, driving means for the loom, and means for de-actuating said driving means when a weft element fails to clear the drop point at a predetermined time.

17. A loom, comprising, in combination, supply means for warp elements, shed-forming means for successively forming vertically-arranged sheds of the warp elements, supporting means for holding a weft element in a vertical position in the warp shed, driving means for the loom, and means for de-actuating said driving means when a weft element extends above a predetermined position in said supporting means.

18. A loom, comprising, in combination, supply means for warp elements, shed-forming means comprising healds driven in horizontally reciprocating motion transversely to the position of warp elements in the loom for successively forming vertically-arranged sheds of the warp elements, and supply means for vertically forwarding weft elements and successively vertically positioning a weft element in each successive warp shed.

19. A loom, comprising, in combination, supply means for continuous warp elements of relatively limp threads, shed-forming means for successively forming vertically arranged sheds of the warp elements, supply means for weft elements of relatively stiff fibers, means for positioning a cut and predetermined length of weft element in each successive shed, and a beater driven about a vertical axis for impelling a weft element into the forward apex of each successive warp shed.

References Cited in the file of this patent

UNITED STATES PATENTS

| | | |
|---|---|---|
| 399,745 | De Hemptinne | Mar. 19, 1889 |
| 463,815 | Parks | Nov. 24, 1891 |
| 1,267,125 | Schwedler | May 21, 1918 |
| 1,678,012 | Lloyd | July 24, 1928 |